United States Patent [19]

Lesti

[11] 4,029,839

[45] June 14, 1977

[54] SOUND AND THERMAL INSULATING CONSTRUCTION ELEMENT

[76] Inventor: Klaus Lesti, Haunstetter Str. 243, Augsburg, Germany

[22] Filed: Dec. 3, 1975

[21] Appl. No.: 637,467

[30] Foreign Application Priority Data

Dec. 6, 1974  Germany .......................... 2457848

[52] U.S. Cl. ................................ 428/306; 260/2.3; 260/4 R; 428/320; 428/323

[51] Int. Cl.² .......................................... B32B 5/00

[58] Field of Search ............... 428/85, 95, 96, 320, 428/323, 306; 260/2.3, 3, 4 R, 5

[56] References Cited

UNITED STATES PATENTS

| | | | |
|---|---|---|---|
| 2,878,153 | 3/1959 | Häcklander | 264/321 |
| 3,213,071 | 10/1965 | Campbell | 428/315 |
| 3,401,128 | 9/1968 | Terry | 264/321 |
| 3,616,029 | 10/1971 | Lerman | 428/315 |
| 3,746,610 | 7/1973 | Hoegger | 428/315 |

Primary Examiner—William J. Van Balen
Attorney, Agent, or Firm—Karl F. Ross; Herbert Dubno

[57] ABSTRACT

Carpet scraps are comminuted into small pieces having a maximum length of between 2 and 10 mm and are mixed with one component of a two-part synthetic-resin foam. The comminuted mixture containing the carpet scraps are then extruded in a thick band on top of a lower cover sheet and the other element of the synthetic-resin foam is sprayed over the band. Thereupon an upper cover sheet is applied to the band and the thus sandwiched band is passed between a pair of pressing belts as the components foam and harden.

10 Claims, 6 Drawing Figures

SOUND AND THERMAL INSULATING CONSTRUCTION ELEMENT

FIELD OF THE INVENTION

The present invention relates to a construction element and a method of making same.

BACKGROUND OF THE INVENTION

A considerable problem in the industrial production of carpet and similar heavy textile materials is disposing of the scraps so produced. Most carpets, in particular the type having fibers secured in a rubber-type backing, must be trimmed both at the edges and at the ends, producing scraps of no commercial value.

These trimmed-off pieces are relatively bulky. Furthermore the carpet scraps, usually made of synthetic-resin material, cannot be burned without creating considerable pollution, nor are these scraps biodegradable so that dumping them, that is using them as land fill or the like, is also unacceptable.

OBJECTS OF THE INVENTION

It is an object of the present invention to provide a new and useful construction element.

Another object is to provide an improved method of utilizing carpet scraps and the like.

SUMMARY OF THE INVENTION

These objects are attained according to the present invention by comminuting the carpet scraps, then mixing them with a binder and pressing them into rigid construction elements. It is possible to use these elements for both sound and thermal insulation since the carpet-scrap filling is ideally suited for these purposes. The difficult problem of disposing of the carpet scraps in an environmentally acceptable manner is completely solved and, at the same time a useful and, indeed, valuable product.

According to other features of this invention the carpet scraps are comminuted so that in no direction do they have a dimension greater than 10 millimeters. The comminution may be such as to reduce them into strips whose length is between 2 and 10 millimeters.

According to other features of this invention the binder is a foamable synthetic resin. A thermosetting resin may be employed or one which simply sets with time once its constituents are mixed together. In both cases the foaming of the resin will serve to form a compact and rigid element when the mass is hardened in a particular shape, as in a mold or between a pair of belts.

In accordance with further features of this invention the binder may be a synthetic-resin material or another natural-rubber elastomer. Latex, polyethylene, polystyrene, polychloroprin, and phenol resins or the like may be used. These binders may be mixed with the comminuted carpet scraps in liquid, powder, or particulate form. Polyurethane may also be used, in which case one constituent of the polyurethane, for instance the polyol, is thoroughly mixed with the comminuted carpet scrap and the other component, the isocyanate, is added to the mixture immediately before it is pressed. It is also within the scope of this invention to use asbestos, cement or similar binders.

The construction element according to the present invention may have outer skins of paper or synthetic-resin material. It is also possible to use the textile material, wood, asbestos, metal or the like. The use of attractive wood veneers allows the construction element to be used not only as decorative but also as thermal and sound insulating panels. Preferably the coating layer at least is made of flame-proof or flame-resistant material.

The construction element according to this invention is rigid and may be of a flat plate shape for use as floor, ceiling, or wall panels, or may be otherwise shaped in order to fit into particular places such as behind the firewall of an automotive vehicle or around a pipe. The extreme durability of the carpet scraps used in the panels makes them very weatherproof and usable under the most severe temperature and moisture conditions. It is even possible to use the elements so formed as packing material, since the carpet scraps are virtually without value and the polyurethane resin is one of the least expensive synthetic resins.

In accordance with the present invention the construction element is produced continuously as a strand. Thus it is compressed perpendicular to its direction of production. It is also possible to produce the construction elements in a split mold. However in accordance with this invention the carpet is first comminuted and then mixed together so that a mass is produced of generally uniform characteristics. The comminuted carpet scraps are then mixed with one component of a foamable synthetic-resin, such as a polyol. Thereafter the soaked mass is extruded on a belt and the other component, for instance an isocyanate, is added to the mixture and the mass is pressed between a pair of belts as the resin foams and hardens.

According to this invention the mass may be extruded onto a lower foil and an upper foil may be laid on top of the mass after the second synthetic-resin component is added so that the construction element has a pair of decorative or uniform skins. Thereafter the continuously extruded mass is cut up transversely into individual construction elements.

SPECIFIC DESCRIPTION

Figure 1:
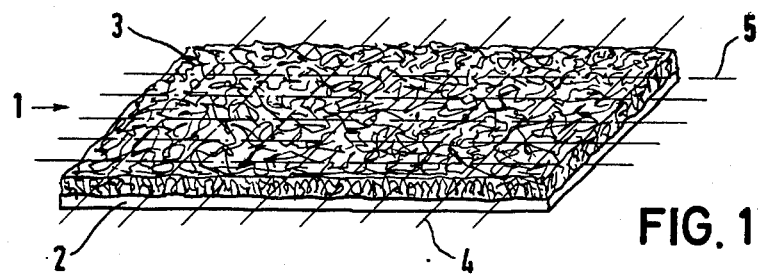
FIG. 1 is a perspective view of a carpet-scrap in accordance with this invention.
Figure 2:
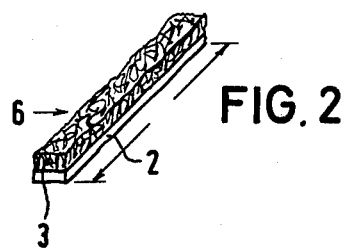
FIG. 2 is a perspective view of a comminuted piece of the scrap shown in FIG. 1.

FIG. 1 shows a carpet scrap 1 comprising a rubbery substrate sheet 2 to which is secured a mass of fibers 3. In accordance with this invention the scrap is subdivided transversely along lines 4 and longitudinally along lines 5 into small pieces 6 such as shown in FIG. 2.

Figure 3:
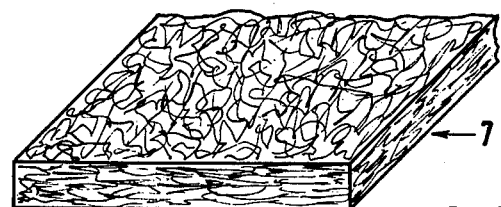
FIGS. 3, 4, and 5 are perspective views of three different construction elements in accordance with this invention.
Figure 4:
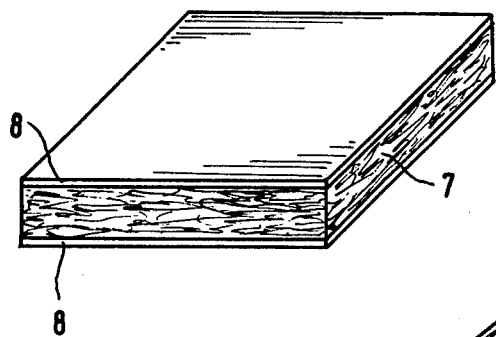
Figure 5:
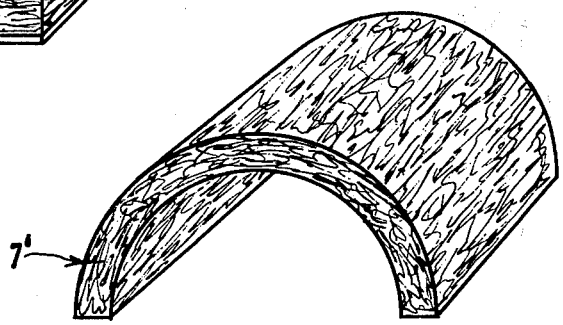

These pieces 6 are mixed with a binder and formed into a construction element 7 such as shown in FIG. 3. It is possible to sandwich this construction element 7 as shown in FIG. 4 between a pair of skins 8. In addition an element 7' may be formed which is of part cylindrical shape.

Figure 6:
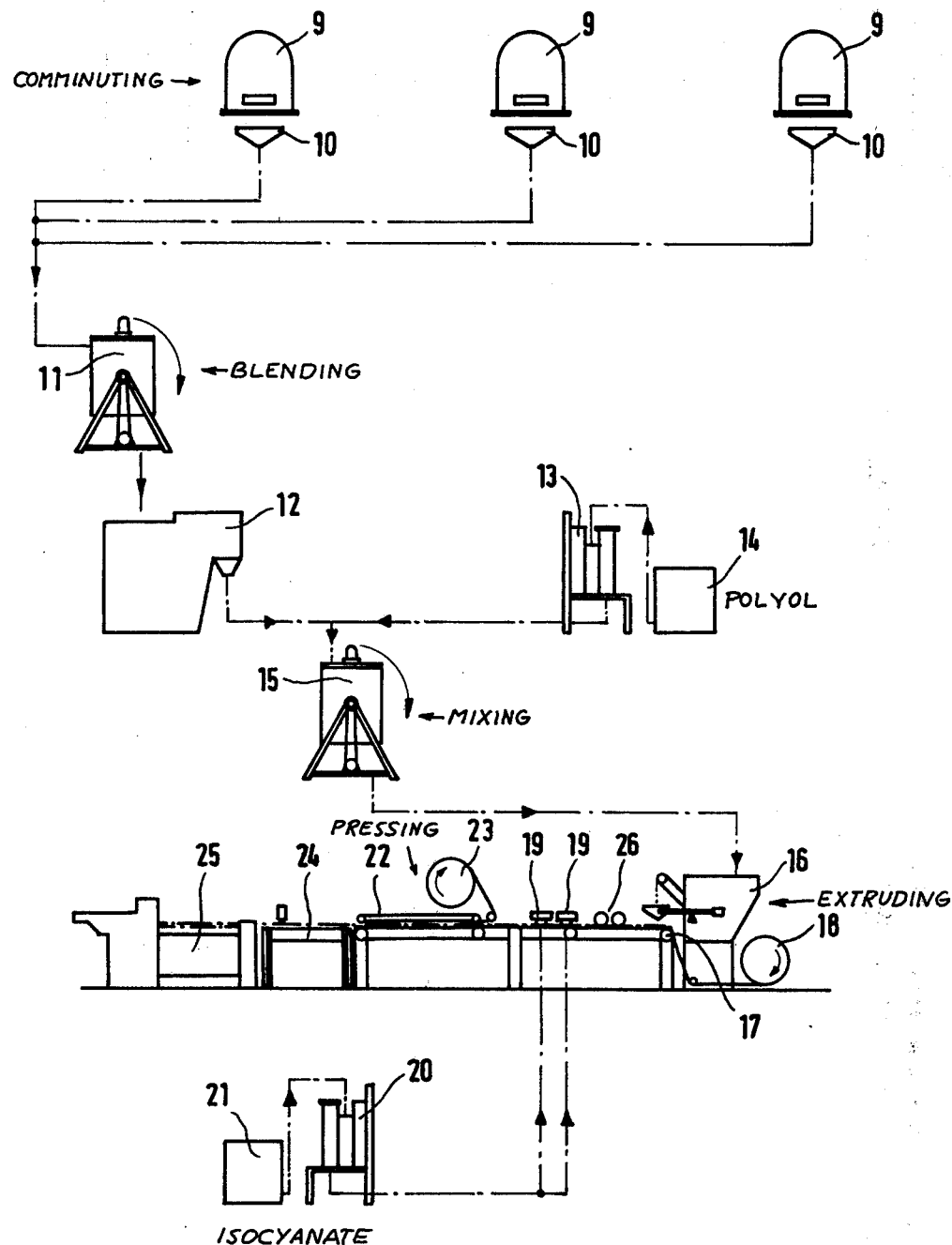
FIG. 6 is a largely diagrammatic view illustrating the production method according to this invention.

The installation shown in FIG. 6 has three comminuting machines 9 that reduce carpet scraps 1 as shown in FIG. 1 to pieces 6 having a length L between 2 and 10 millimeters. The comminuted pieces are collected at 10 and mixed together in a blender 11 after which they are stored in a hopper 12.

The blended and comminuted scraps are fed from the blender 12 to a mixer 15 into which polyol from a reservoir 14 and a binder mixer 13 is also added. This mixer 15 therefore produces a wet mass of comminuted carpet scraps mixed with polyol and feed it to an extruder 16 that extrudes a thick band of this mass on top of a lower foil 17 being pulled off a supply roll 18 and lying on top of a conveyor 27. Rollers 46 impart uniform thickness to the band emerging from the extruder 16. Isocyanate from a supply 21 is passed via a pump 20 to sprayers 19 downstream of the rollers 26 above the conveyor 27 to soak the even mass thereon. Another band 28 from the supply 23 is then applied to the top of the band in which both of the components of polyurethane foam are present and the thus sandwiched band passes between two press bands 22. The extrusion speed and conveying rate are such that before the band emerges from the downstream end of the press 22 it is hard and cured sufficiently to be handled.

Thereafter the band is cut up transversely at 24 and stacked at 25. The elements have a thickness of at least 2 centimeters, that is twice the maximum length of the carpet scraps.

I claim:

1. A method of making a construction element comprising the steps of:
   comminuting carpet which consists of a rubbery backing and fibers anchored thereto on one side into small pieces,
   mixing said pieces with a binder to form a pressable mass, and
   pressing said mass and hardening said binder to form a rigid insulating construction element.

2. The method defined in claim 1 wherein said carpet is comminuted into pieces having a maximum length of between 2 mm and 10 mm.

3. The method defined in claim 2 wherein the said pieces are first mixed with one component of a synthetic-resin foam constituting said binder, then are extruded as a continuous strand, then are mixed with the other component of said synthetic-resin foam constituting said binder and thereafter are pressed.

4. The method defined in claim 1 wherein said mass is extruded on a lower foil, said method further comprising the steps of applying an upper foil on top of said mass immediately prior to pressing thereof.

5. A construction element comprising a pressed rigid mass of a hardened binder and comminuted carpet pieces which consists of a rubbery backing and fibers anchored thereto on one side, said pieces being embedded in said binder and held together thereby.

6. The element defined in claim 5 wherein said binder is a synthetic-resin foam.

7. The element defined in claim 5 wherein said binder is an adhesive selected from the group containing rubber, latex, polyethylene, phenol resin, polystyrol, and polychloroprene.

8. The element defined in claim 5, further comprising at least one skin on at least one face of said element.

9. The element defined in claim 5 wherein said binder is polyurethane foam.

10. The element defined in claim 5 wherein said carpet pieces have a maximum length of 10 mm and said element is at least 20 mm thick.

* * * * *